US00RE44857E

(19) United States
(12) Reissued Patent
Tokunaga

(10) Patent Number: US RE44,857 E
(45) **Date of Reissued Patent: *Apr. 22, 2014**

(54) IMAGE SENSING APPARATUS AND CONTROL METHOD THEREOF

(71) Applicant: Canon Kabushiki Kaisha, Tokyo (JP)

(72) Inventor: Tatsuyuki Tokunaga, Saitama (JP)

(73) Assignee: Canon Kabushiki Kaisha, Tokyo (JP)

( * ) Notice: This patent is subject to a terminal disclaimer.

(21) Appl. No.: 13/755,809

(22) Filed: Jan. 31, 2013

Related U.S. Patent Documents

Reissue of:
(64) Patent No.: 7,545,427
Issued: Jun. 9, 2009
Appl. No.: 10/713,402
Filed: Nov. 13, 2003

U.S. Applications:
(63) Continuation of application No. 13/155,180, filed on Jun. 7, 2011, now Pat. No. Re. 44,030.

(30) Foreign Application Priority Data

Nov. 19, 2002 (JP) ..... 2002-335101

(51) Int. Cl.
*H04N 3/14* (2006.01)
*H04N 5/335* (2011.01)
*G06F 1/00* (2006.01)

(52) U.S. Cl.
USPC ..... 348/312; 348/245; 348/296; 713/501

(58) Field of Classification Search
None
See application file for complete search history.

(56) References Cited

U.S. PATENT DOCUMENTS

| | | | | |
|---|---|---|---|---|
| 5,506,700 | A | 4/1996 | Nishimura | |
| 6,160,578 | A * | 12/2000 | Carroll et al. | 348/222.1 |
| 6,897,699 | B1 * | 5/2005 | Nguyen et al. | 327/295 |
| 7,061,530 | B2 * | 6/2006 | Koyama | 348/241 |
| RE44,030 | E * | 2/2013 | Tokunaga | 348/312 |

FOREIGN PATENT DOCUMENTS

| | | |
|---|---|---|
| EP | 0 729 272 A2 | 8/1996 |
| WO | 99/66710 A1 | 12/1999 |

OTHER PUBLICATIONS

European Search Report dated Aug. 9, 2007.

* cited by examiner

*Primary Examiner* — Aung S Moe
(74) *Attorney, Agent, or Firm* — Cowan, Liebowitz & Latman, P.C.

(57) ABSTRACT

An image sensing apparatus, having an image sensor for sensing an image of an object and an analog-digital converter which operates at a predetermined frequency and converts an analog signal read from the image sensor to a digital signal, controls the relationship between a phase of the analog signal read from the image sensor and a phase of a timing signal for operating the analog-digital converter in accordance with the peripheral condition.

5 Claims, 10 Drawing Sheets

IMAGE SENSING APPARATUS AND CONTROL METHOD THEREOF

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a continuation of reissue application Ser. No. 13/155,180, filed Jun. 7, 2011; which is a reissue of U.S. Pat. No. 7,545,427, the entire disclosures of which are hereby incorporated by reference.*

FIELD OF THE INVENTION

The present invention relates to an image sensing apparatus for sensing an image of an object, and a control method thereof.

BACKGROUND OF THE INVENTION

The advancement of digital image sensing apparatus such as a digital video camera has been very rapid these days. The number of pixels and density of pixels have been improved, and a digital image sensing apparatus capable of sensing an image with the quality substantially equivalent to the quality of an image sensed by a conventional image sensing apparatus using a silver halide film. In such digital image sensing apparatus in general, analog signals obtained by photoelectrical conversion are read out from an area sensor pixel by pixel and undergo analog-digital (A/D) conversion to form an image using the digital data. As the number of the pixels increases, the resolution of an image as well as the quality of the image improve. However, if the processing speed of A/D conversion does not improve, the time taken to read a frame of an image is prolonged, which makes the frame rate—the number of images that can be sensed per second—decrease. Accordingly, there are desires to achieve the following: increase a reading speed of an area sensor and an A/D conversion speed, and improve a multi-channel reading technique of reading a frame image via a plurality of channels.

In a method of increasing the reading speed and A/D conversion speed, there are problems in the response speed of an amplifier used for reading, as well as clock noise. These problems constrict a good phase range for an A/D conversion period with respect to a read-out period. The same problems also cause phase shift, and make noise conspicuous in an image, and/or cause pattern noise. Accordingly, it was very difficult to achieve an image of high quality. As for multi-channel reading, noise generated in multiplexing signals read via a plurality of channels and cross-stroke between channels also constrict a good phase range for an A/D conversion period with respect to a read-out period, which also makes it difficult to achieve an image of high quality. In addition, pulses used for reading pixel signals from an area sensor are generated by a timing generator (TG), and a delay since the pulses are generated until the signals are actually read out changes depending upon temperature. The delay also differs from one image sensor from another. Thus, it was very difficult to compensate a phase shift using a circuit so as to always perform A/D conversion with a good phase to output read signals.

SUMMARY OF THE INVENTION

The present invention has been made in consideration of the above situation, and has as its object to perform A/D conversion on an output signal from an area sensor with a good phase in accordance with external conditions in high-speed read-out operation.

According to the present invention, the foregoing object is attained by providing an image sensing apparatus having an image sensor for sensing an image of an object, comprising:

an analog-digital converter that operates at a predetermined frequency and converts an analog signal read from the image sensor to a digital signal; and a controller that controls a relationship between a phase of the analog signal read from the image sensor and a phase of a timing signal for operating the analog-digital converter in accordance with a peripheral condition of the image sensing apparatus.

According to the present invention, the foregoing object is also attained by providing an image sensing apparatus having an image sensor for sensing an image of an object, comprising:

an analog-digital converter that operates at a predetermined frequency and converts an analog signal read from the image sensor to a digital signal; and a controller that controls a relationship between a phase of the analog signal read from the image sensor and a phase of a timing signal for operating said analog-digital converter on the basis of a comparison between signals obtained by relatively shifting the phase of the analog signal and the phase of the timing signal, and converting the analog signal by said analog-digital converter for each phase.

According to the present invention, the foregoing object is also attained by providing a control method of an image sensing apparatus having an image sensor for sensing an image of an object and an analog-digital converter which operates at a predetermined frequency and converts an analog signal read from the image sensor to a digital signal, comprising:

obtaining a peripheral condition of the image sensing apparatus; and adjusting a relationship between a phase of the analog signal read from the image sensor and a phase of a timing signal for operating the analog-digital converter in accordance with the peripheral condition.

According to the present invention, the foregoing object is also attained by providing a control method of an image sensing apparatus having an image sensor for sensing an image of an object and an analog-digital converter which operates at a predetermined frequency and converts an analog signal read from the image sensor to a digital signal, comprising:

relatively shifting a phase of the analog signal read from the image sensor and a phase of a timing signal for operating the analog-digital converter; and determining a relationship between the phase of the analog signal read from the image sensor and the phase of the timing signal on the basis of a comparison between signals obtained by converting the analog signal by the analog-digital converter for each phase.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

A first embodiment of the present invention will be described first.

Figure 1:
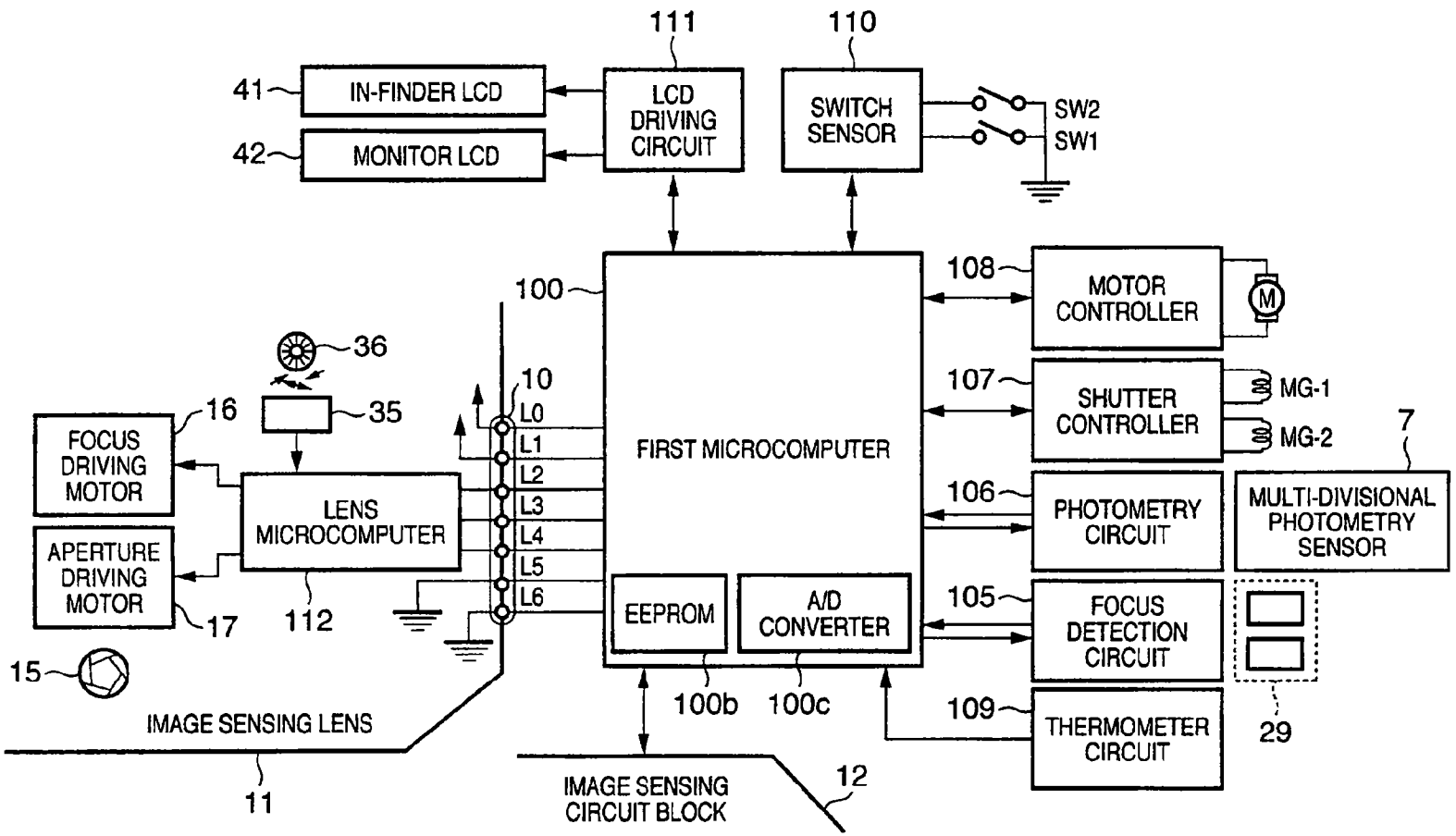
FIG. 1 is a block diagram illustrating a partial configuration of an image sensing apparatus according to an embodiment of the present invention.
Figure 2:
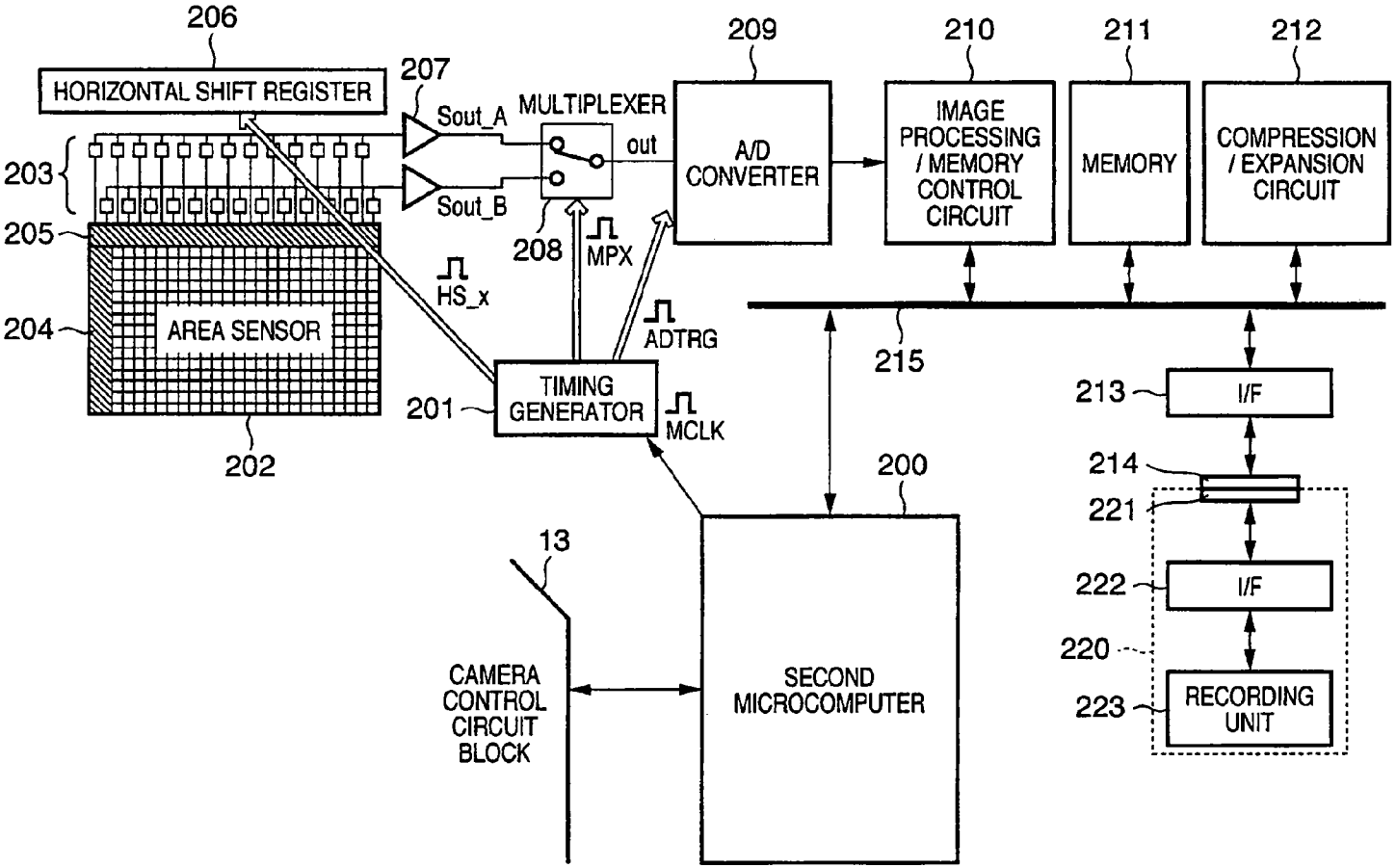
FIG. 2 is a block diagram illustrating a partial configuration of the image sensing apparatus according to the embodiment of the present invention.

FIGS. 1 and 2 show block diagrams of a configuration of an image sensing apparatus according to the first embodiment of the present invention.

Referring to FIG. 1, a first microcomputer 100 controls an operation of an entire image sensing apparatus using a predetermined firmware.

EEPROM 100b can store image sensing information.

An A/D converter 100c converts analog signals from a focus detection circuit 105, photometry circuit 106, and a thermometer circuit 109 into digital signals, and the first microcomputer 100 applies signal processes to the converted digital signals and sets corresponding states.

The focus detection circuit 105, the photometry circuit 106, a shutter controller 107, a motor controller 108, a switch sensor 110, an LCD driving circuit 111, and the thermometer circuit 109 are connected to the first microcomputer 100. The first microcomputer 100 transmits/receives signals to/from the image sensing lens 11 via mount connection points 10. Further, the first microcomputer 100 also transmits/receives signals to/from an image sensing circuit block 12. The image sensing circuit block 12 will be described later with reference to FIG. 2.

Line sensors 29 are used for detecting focus states at a plurality of points within an image sensing frame, and pairs of focus detection points are arranged on a secondary imaging plane of an image sensing optical system. The focus detection circuit 105 controls charge accumulation and reading operation of the line sensors 29 in accordance with a signal from the first microcomputer 100, and outputs pixel information obtained by photoelectric conversion in the respective line sensors 29 to the first microcomputer 100.

The first microcomputer 100 performs analog-digital conversion on the information and performs focus detection using a known phase difference detection method. The first microcomputer 100 exchanges signals with a lens microcomputer 112 and controls focus by driving a lens based on the focus detection information.

The photometry circuit 106 outputs signals from a multi-divisional sensor 7 whose image sensing area is divided into a plurality of regions to the first microcomputer 100 as luminance signals of the respective regions of the image sensing area.

The first microcomputer 100 performs analog-digital conversion on the luminance signals, and calculates an aperture value and shutter speed for exposure control for image sensing operation using the converted luminance signals.

The shutter controller 107 runs the front curtain (MG-1) and the rear curtain (MG-2) in accordance with a signal from the first microcomputer 100, thereby properly exposing an area sensor.

The motor controller 108 controls a motor in accordance with a signal from the first microcomputer 100, thereby moving a main mirror up and down, and mechanically charging a shutter.

SW1 is turned on by a first stroke (e.g., a half stroke) of a release button (not shown) and initiates photometry and autofocus operations. SW2 is turned on by a second stroke (e.g., a full stroke) of the release button and initiates an exposure operation.

Signals from SW1, SW2 and other not-shown operating members of the image sensing apparatus are detected by the switch sensor 110 and sent to the first microcomputer 100.

The LCD driving circuit 111 controls display of an LCD 41 provided within a finder and an LCD 42 for monitoring in accordance with signals from the first microcomputer 100.

Next, a configuration of the image sensing lens 11 is explained. The image sensing apparatus main body and the image sensing lens 11 are electrically connected with each other via the lens mount connection points 10. The lens mount connection points 10 includes a point LO which is a power supply connection point for a focus driving motor 16 and an aperture driving motor 17 within the image sensing lens 11, a point L1 which is a power supply connection point for the lens microcomputer 112, a point L2 for a clock used for performing known serial data communication, a point L3 for data transmission from the image sensing apparatus to the image sensing lens 11, a point L4 for data transmission from the image sensing lens 11 to the image sensing apparatus, a point L5 which is a ground connection point of the power supply for the motors, and a point L6 which is a ground connection point of power supply for the lens microcomputer 112.

The lens microcomputer 112 is connected with the first microcomputer 100 via these lens mount connection points 10, and operates the focus driving motor 16 and the aperture driving motor 17, thereby controlling focus and aperture of the image sensing lens 11. Reference numerals 35 and 36 denote a photodetector and a pulse plate, and the lens microcomputer 112 counts the number of pulses, thereby obtaining position information of a first lens group for changing focal points, and thus focus control of the lens 11 can be performed.

Next, the image sensing circuit block 12 will be explained in detail with reference to FIG. 2.

Reference numeral 200 denotes a second microcomputer for controlling the image sensing circuit block 12. By transmitting/receiving signals to/from the camera control circuit block 13 explained with reference to FIG. 1, the second microcomputer 200 controls a series of operations, such as reading pixel output from an area sensor 202 which senses an image of an object, performing A/D conversion by an A/D converter 209, forming an image, and recording the image on a recording medium 220. Reference numeral 201 denotes a timing generator (TG) and controls charge accumulation in the area sensor 202, reading of pixel output, and operations of a multiplexer 208 and the A/D converter 209 in accordance with instructions from the second microcomputer 200.

Reference numeral 202 denotes the area sensor, and charges accumulated in millions of pixels by photoelectric conversion can be read out. Reference numeral 203 denotes capacitors for temporarily storing pixel output of one line when reading the charges from the pixels. The charges in every other line are read out via two channels. Reference numeral 204 denotes horizontal optical black (OB) pixels which are shielded from light. The charges accumulated in the horizontal OB pixels 204 are also read out via the capacitors 203 similarly to the charges from the pixels other than the OB pixels. Reference numeral 205 denotes vertical OB pixels which carry the same role as the horizontal OB pixels; 206, horizontal shift register which sequentially selects the pixel output of one line temporarily stored in the capacitors 203 via two channels; 207, amplifiers for two channels which buffer pixel outputs from the capacitors 203; and 208, the multiplexer which alternately selects outputs from the two channels.

The horizontal shift register 206 controls the output timing of signals from the two channels so that the phases of the output signals differs by 180 degrees from each other, thus the output from the multiplexer 208 has a half of the operation period of the horizontal shift register 206. Reference numeral 209 denotes an A/D converter which performs A/D conversion sequentially on the output from the multiplexer 208 at timing in accordance with an ADTRG signal from the TG 201.

Reference numeral 210 denotes an image processing/memory control circuit which sequentially stores the A/D converted output from the A/D converter in a memory 211. Then the signal processing/memory control circuit 211 processes the digital data stored in the memory 211 thereby forming an image, and stores the image data in the memory 211.

Reference numeral 212 denotes a compression/expansion circuit which compresses and expands image data with, inter alia, adaptive discrete cosine transform (ADCT). The compression/expansion circuit 212 reads image data stored in the memory 211 and performs compression processing or expansion processing on the read image data, then writes the processed image data to the memory 211.

Reference 213 denotes an interface with a recording medium such as, inter alia, a memory card and hard disk; 214, a connector for connecting with a recording medium such as, inter area, a memory card and a hard disk; and 220, a recording medium such as a hard disk.

The recording medium 220 has a recording unit 223 such as a semi-conductor memory and a magnetic disk, an interface 222 for interfacing with the image sensing apparatus, and a connector 221 for connecting with the image sensing apparatus. The compressed image data is recorded on the recording medium 220 via the interface 213.

Next, an operation of the image sensing apparatus according to the first embodiment is explained with reference to FIG. 3.

In step S101, the first microcomputer 100 monitors the switch SW1 which turns on by the first stroke of the release button. This process is repeated until the turn-on of the switch SW1 is detected. When the switch SW1 is turns on, the process moves to the next step.

In step S102, the first microcomputer 100 obtains peripheral temperature by A/D-converting information from the thermometer circuit 109.

In step S103, the first microcomputer 100 obtains luminance data on objects in a plurality of areas in a frame by A/D-converting information from the photometry circuit 106. The obtained luminance data is corrected using the temperature data obtained in step S102 to a proper luminance information. The shutter speed and aperture value to be used in exposure operation (to be described later) are calculated based on the corrected luminance information.

In step S104, the first microcomputer 100 performs focus detection operation with the known phase difference detection method by operating the focus detection circuit 105.

There are a plurality of points where focus states are detected (referred to as "distance measurement points"), and the first microcomputer 100 calculates defocused amounts at the respective distance measurement points. Upon calculating the defocused amounts, the defocused amounts are corrected using the temperature data obtained in step S102 to have proper defocused amounts.

The first microcomputer 100 determines at which distance measurement point a main object exists using a known algorithm based on the calculated defocused amounts of the respective distance measurement points, and decides the determined distance measurement point as a main point.

The known algorithm includes, inter alia, a near-point priority method of selecting the nearest of the distance measurement points and a method of grouping the distance measurement points by defocused amounts and selecting one of the groups. However, the algorithm does not directly relate to the present invention, the detailed explanation of it is omitted.

The first microcomputer 100 controls the focus point of the lens by communicating with the image sensing lens 11 so that the selected distance measurement point is focused.

In step S105, the first microcomputer 100 designates the LCD driving circuit 111 to display the shutter speed, aperture value, and focus information.

In step S106, the first microcomputer 100 determines whether the switch SW2 which turns on by the second stroke of the release button is ON. If the switch SW2 is OFF, the processes of steps S101 to S105 are repeated, whereas if the switch SW2 is ON, the process proceeds to step S107 where so-called exposure operation starts.

In step S107, the first microcomputer 100 initiates the exposure operation.

The main mirror is moved up, and the lens and the aperture are controlled.

In step S108, the first microcomputer 100 sends a designation to the second microcomputer 200, in turn, the second microcomputer 200 starts charge accumulation in the area sensor 202. Further, the first microcomputer 100 controls the shutter controller 107 so that a determined shutter speed (TV) is realized.

In step S109, the second microcomputer 200 receives the temperature data obtained in step S102 from the first microcomputer 100, and determines the phase of a signal for operating the A/D converter 209. The second microcomputer 200 sends an instruction to the TG 201, in turn, the TG 201 outputs the ADTRG signal with the determined phase to the A/D converter 209.

In step S110, the pixel output from the area sensor 202 is A/D-converted by the A/D converter 209 in accordance with the ADTRG signal from the TG 201, then stored in the memory 211 under control of the image processing/memory control circuit 210.

The digital data stored in the memory 211 is processed by the image processing/memory control circuit 210 in step S111, compressed by the compression/expansion circuit 212, then stored in the memory 211 again.

The compressed image data is recorded on the recording medium 220 in step S112, and the series of the image sensing operation ends.

Thereafter, the process returns to step S101.

Figure 3:
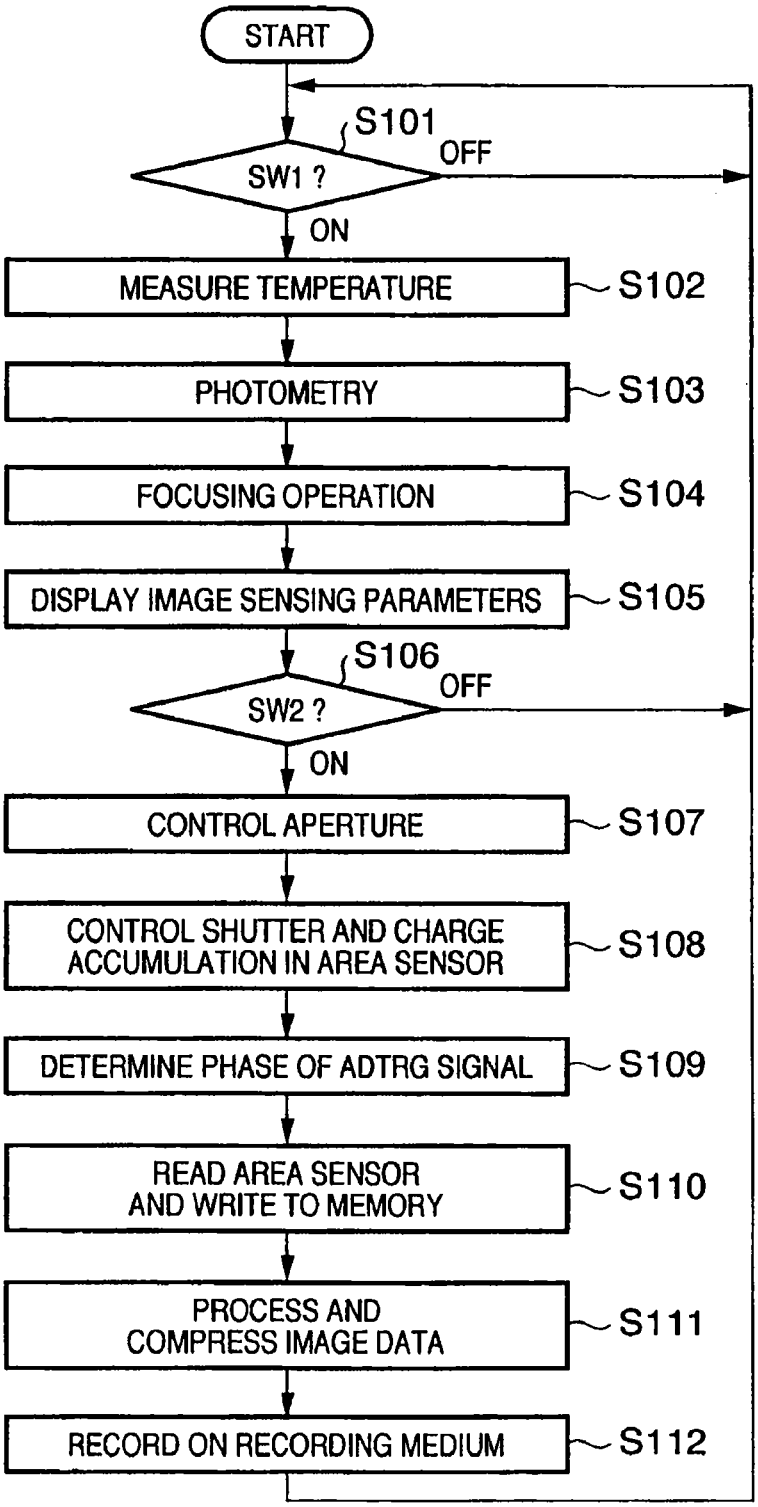
FIG. 3 is a flowchart showing an operation of the image sensing apparatus according to the embodiment of the present invention.
Figure 4:
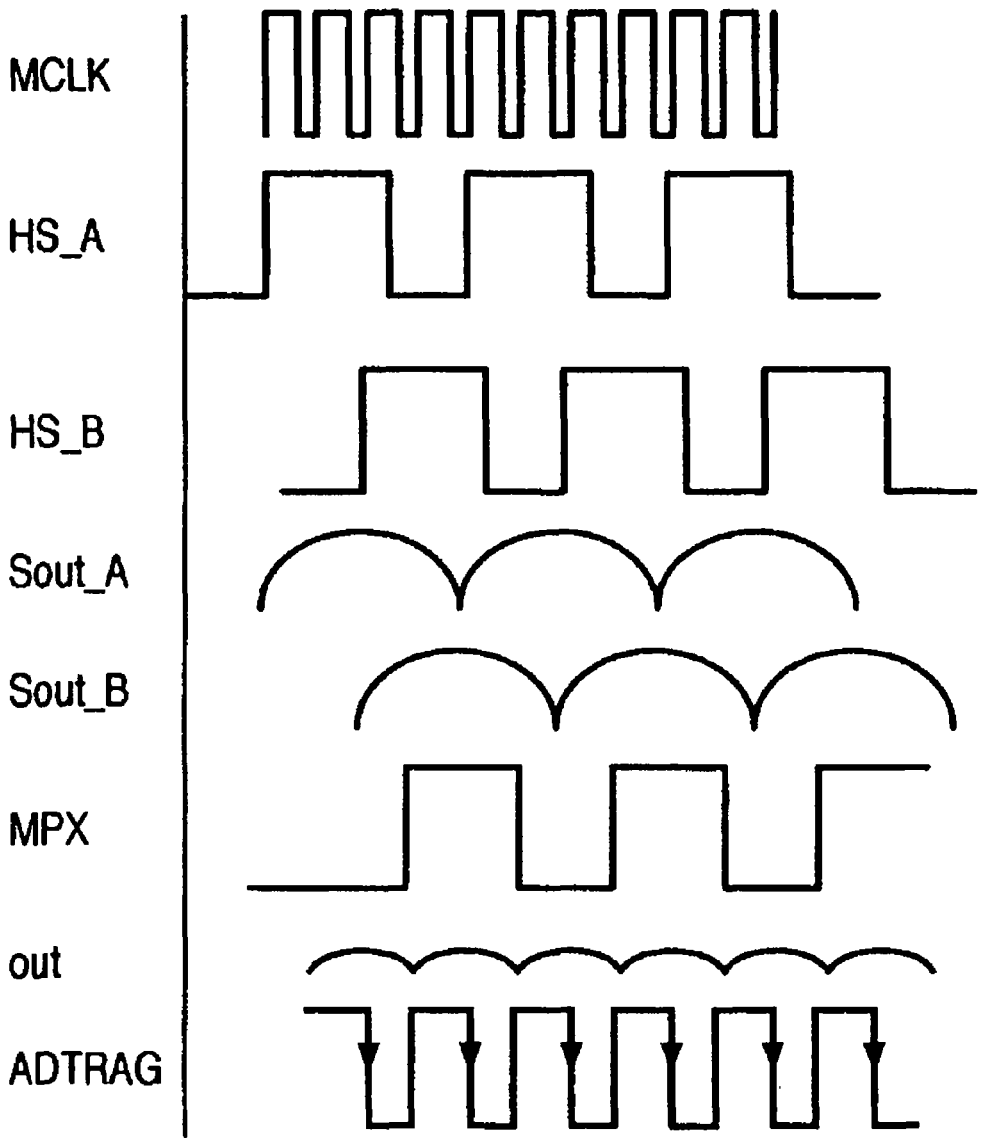
FIG. 4 is a timing chart of read-out timing of an area sensor, read-out signals, and a timing signal provided to an A/D converter.

FIG. 4 is a timing chart for explaining an operation of step S110 in FIG. 3 in relation to signals from TG 201. The TG 201 generates a master clock MCLK, and outputs signals HS_A and HS_B for driving the horizontal shift register 206. The phases of the signals HS_A and HS_B are shifted by 180 degrees from each other, and used to read pixel outputs of one line of the area sensor temporarily stored in the capacitors 203 via two channels. The read outputs are indicated by Sout_A and Sout_B in FIG. 4, respectively. The TG 201 outputs a signal MPX to the multiplexer 208. Sout_A and Sout_B are multiplexed and becomes a signal "out". The TG 201 outputs to the A/D converter 209 the ADTRG signal for operating the A/D converter 209, and the A/D converter 209 A/D-converts the signal "out" at timing of trailing edges of the ADTRG signal. If the phases of the signal "out" and the ADTRG signal are not properly matched, the dynamic range may become narrow because the output becomes small, a noisy image may be resulted because A/D conversion is performed where the output signal is noisy due to MPX clock, and a striped image may be resulted because the phases of Sout_A and Sout_B are slightly shifted from each other and output levels of the two channels differs from each other. Thus, it is very important to properly match the phases of the signal "out" and the ADTRG signal.

Figure 5:
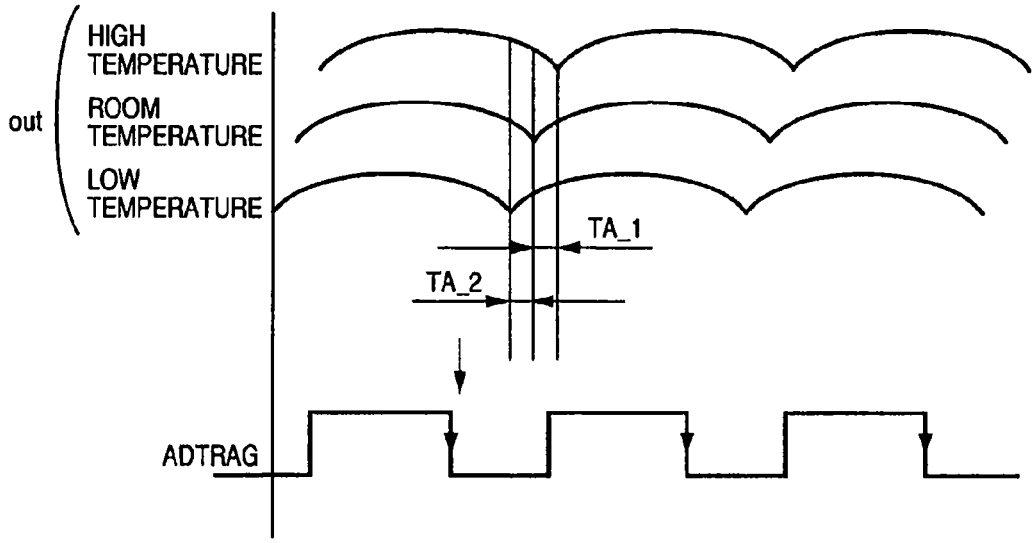
FIG. 5 shows a timing chart showing a change of a read-out signal from the area sensor with respect to temperature.

In general terms, the signal "out" is generated by multiplexing signals Sout_x read out in accordance with clock signals HS_x generated on the basis of the master clock MCLK, while the ADTRG signal is generated based on the master clock MCLK signal. Since transmission of a signal is accompanied by a delay, change in temperature causes a change in time since the signal MCLK is generated until the signal "out" is outputted, and a change in time since the signal MCLK is generated until the ADTRG signal is transferred to the A/D converter 209. This causes phase shifts of the signal "out" and the signal ADTRG. FIG. 5 conceptually shows how the relationship between phases of the signal "out" and the ADTRG signal changes with respect to temperature. Compared to a room temperature, the signal "out" delays for TA_1 at high temperature, while it is faster by TA_2 at low temperature. Thus, a proper phase of ADTRG changes as the temperature changes.

Figure 6:
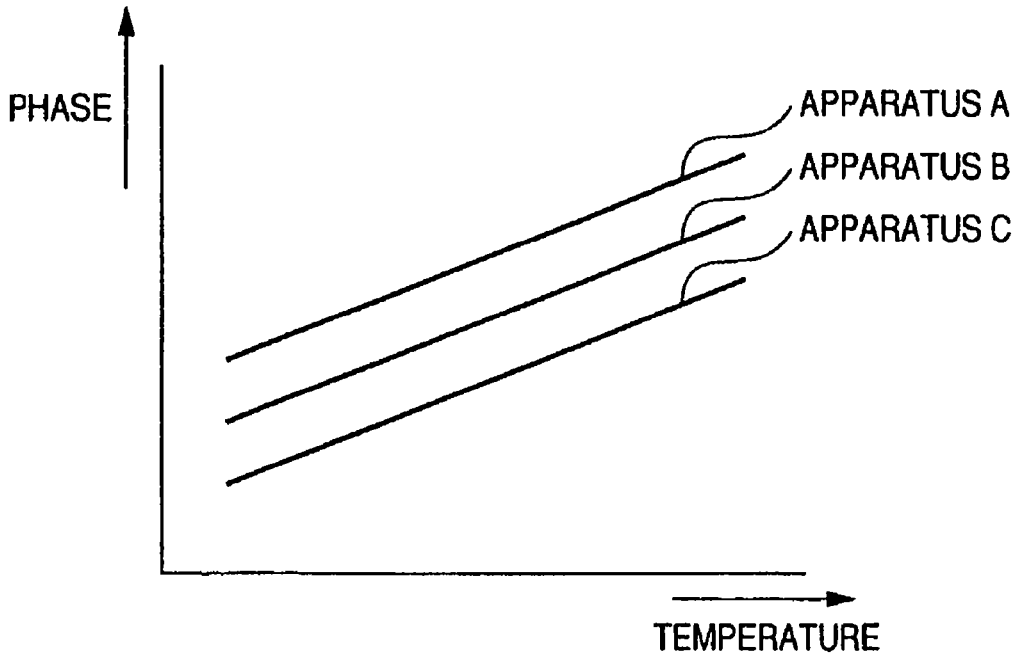
FIG. 6 is a graph showing shift amounts of delay when reading signals in different area sensors with respect to temperature.

FIG. 6 shows how the phase of the signal "out" proceeds and delays with respect to temperature. In FIG. 6, the three graphs of apparatus A, apparatus B and apparatus C are shown as examples. These graphs show that shift amounts of phases with respect to temperature are similar, but not identical for different image sensing apparatus, although the phases themselves are different for respective apparatuses.

Figure 7:
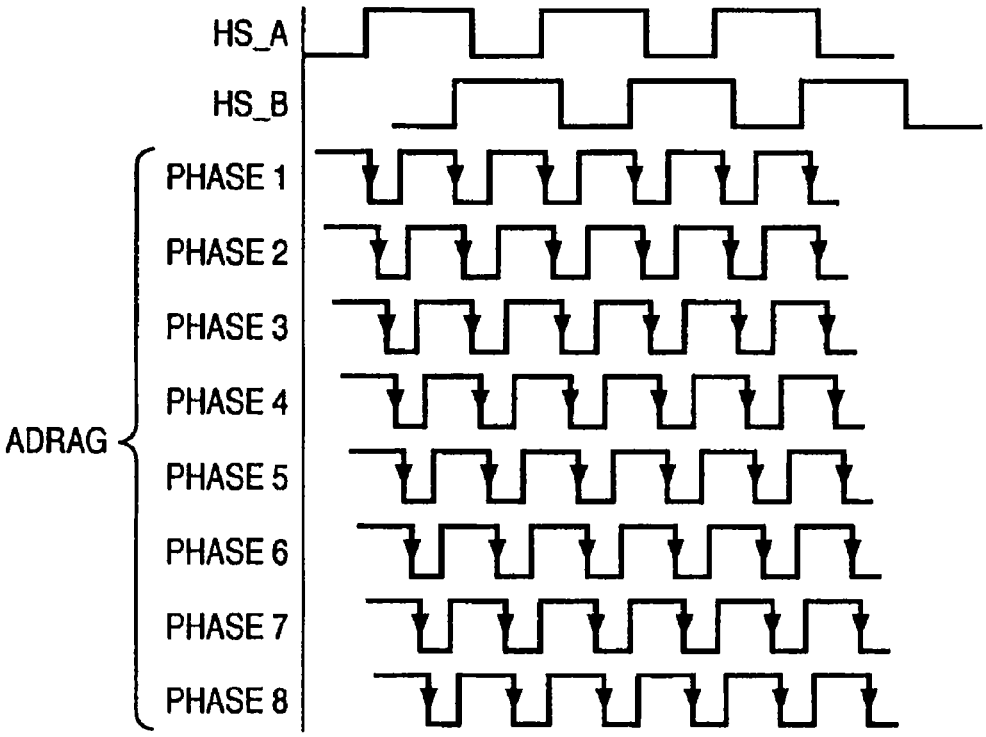
FIG. 7 is a diagram showing phases of a signal for operating the A/D converter.
Figure 8:
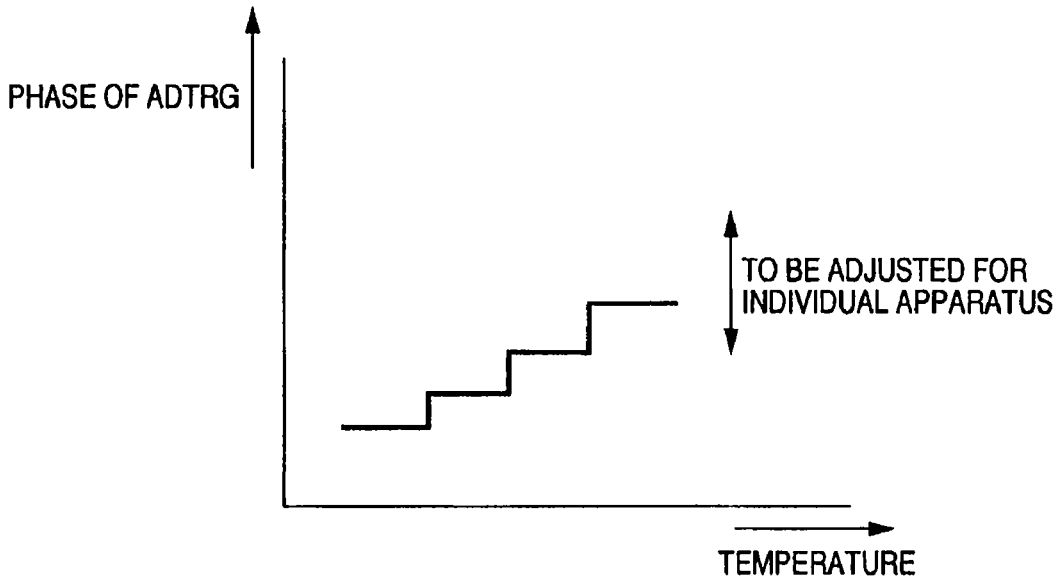
FIG. 8 is a graph showing phases of the timing signal for operating the A/D converter to be used at different temperatures.

Here, processing for determining a phase of a signal for operating the A/D converter 209 performed in step S109 in FIG. 3 will be explained in detail. As shown in FIG. 7, the phase of the ADTRG signal can be selected from the phases 1 to 8 for the signals HS_A and HS_B. In the first embodiment, a phase is selected from the phases 1 to 8 in accordance with the temperature as exemplified in FIG. 8. More specifically, if the phase 5 is proper at the room temperature, since the signal "out" proceeds as the temperature decreases, the phase of the ADTRG signal should be also proceeded and the phase 4 is selected. If the temperature further decreases, then the phase 3 is selected. In contrast, if the temperature is higher than the room temperature, the phase 6 is selected.

By obtaining proper phases for different temperatures and storing the relationship between the obtained proper phases and the temperatures in, for example, a memory (not shown) in the second microcomputer 200, it is possible to quickly generate the ADTRG signal with a proper phase only by detecting temperature.

It should be note that the phase at the room temperature may be the phase 5, phase 4, or phase 6 depending upon an apparatus, since the proper phase differs apparatus from apparatus.

Next an operation of adjusting the phase of a signal for operating the A/D converter 209 in each image sensing apparatus, which is typically performed at a factory before image sensing apparatuses are shipped, is explained with reference to FIG. 9.

In step S201, a parameter X is substituted by a value a. The value a is an initial value of phase indicative of the maximum of the prepared phase levels for phase adjustment of the ADTRG signal. In the example shown in FIG. 7, the value a is "8" corresponding to the phase 8.

Next in step S202, an area sensor of the image sensing apparatus is illuminated uniformly by a predetermined amount of light, and the generated charges are read out and A/D-converted at timings in accordance with the ADTRG signal of a phase (X), and sensitivities of the two channels are adjusted so that a predetermined value is obtained. There are a variety of methods for adjusting the sensitivities. For instance, gains of the amplifiers 207 for the respective two channels may be adjusted, a reference voltage fed to the A/D converter 209 may be adjusted, and so on.

In step S203, the parameter X is decreased by 1.

In step S204, the area sensor 202 of the image sensing apparatus is illuminated uniformly by a predetermined amount of light, and the generated charges are read out and A/D-converted at timings-in accordance with the ADTRG signal with a phase (X).

In step S205, the output of an image obtained in step S204 is evaluated, and whether the phase of the ADTRG signal is proper or not is determined. Judgement of whether the phase of the ADTRG signal is proper or not is performed as follows. When adapting an assumption that a phase with which the maximum output level is obtained is proper, if the output of the image obtained in step S204 is lower than the sensitivity adjusted in step S202, then the phase used in step S202 is determined proper.

If it is determined that the phase is OK (OK in step S205, the phase is increased by 1 in step S206 in order to obtain the phase used in step S202 since the parameter X was decreased by 1 in step S203. Then the increased phase is determined as the proper phase.

Whereas, if the judgement of phase of the ADTRG signal reveals no good (NG) in step S205, whether or not the parameter X decreased more than the limit, and if not, the process in step S202 and the subsequent processes are repeated. The limit is "2" which corresponds to the phase 2 in a case shown in FIG. 7 so that the parameter X can be decreased in step S203.

By repeating processes from step S202 to step S205, the parameter X is decreased one by one and the judgement is performed from, in the example shown in FIG. 7, the phase 8 toward the phase 1 sequentially, it is possible to find a proper phase of the ADTRG signal.

Further, if no proper phase of the ADTRG signal has been found when the parameter X reached the last parameter, namely, when the parameter X became lower than the limit, the process is determined as NG and returned to a preceding process in a manufacturing process of the image sensing apparatus.

Next, another method of finding a proper phase of the ADTRG signal will be described.

When adapting an assumption that a phase with which the sensitivities of the outputs from the two channels are least sensitive with respect to the phase shift is proper, the outputs of the image from the two channels obtained in step S204 are compared, and the least output difference indicates that the phase used in the preceding step S202 is proper. When the difference between the outputs from the two channels become large as the phase shifts, a pattern noise, such as vertical stripes will appear.

In the above description, a configuration for adjusting the phase of a signal for operating the A/D converter 209 is explained. However, the present invention is also applicable to a case of adjusting the phase of the analog signal which is read out from the area sensor 202 but has not been inputted to the A/D converter 209 yet.

Figure 9:
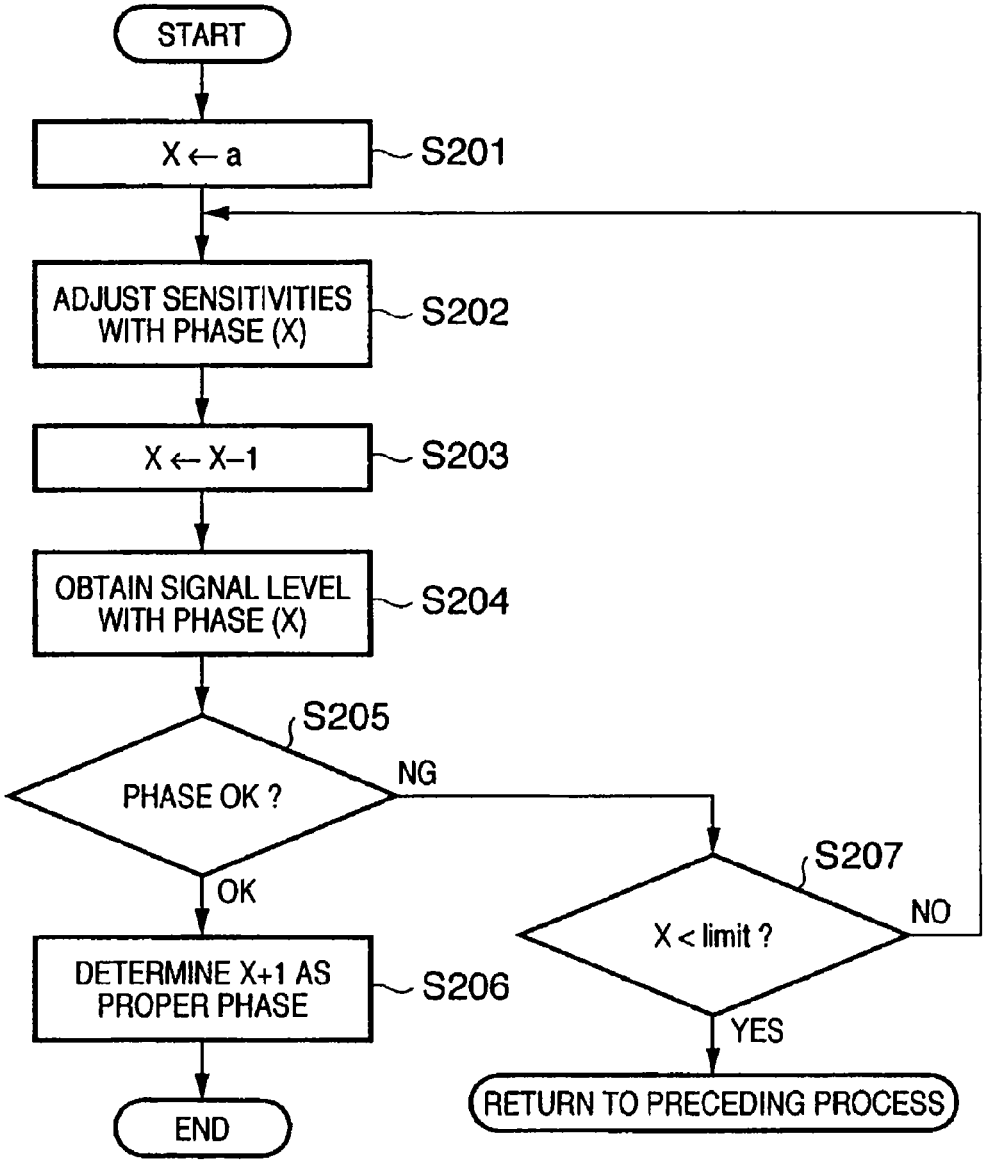
FIG. 9 is a flowchart showing processing for determining the phase of the timing signal for operating the A/D converter at a reference temperature according to a first embodiment of the present invention.

Further, in the processing shown in FIG. 9, a proper phase of the ADTRG signal is searched from the maximum phase level (phase 8 in FIG. 7) in the descending order. However, the proper phase may be searched from the minimum phase level (phase 1 in FIG. 7) in the ascending order. In that case, the parameter X is increased by 1 in step S203, and the parameter X is decreased by 1 in step S206.

Second Embodiment

Next, a second embodiment of the present invention will be explained.

In the second embodiment, variation in a phase of a signal for operating an A/D converter specific to each image sensing apparatus and change in phase of the signal (ADTRG signal) for operating the A/D converter due to temperature are automatically adjusted when reading signals from pixels which are located outside of an effective image sensing region of an area sensor.

Figure 10:
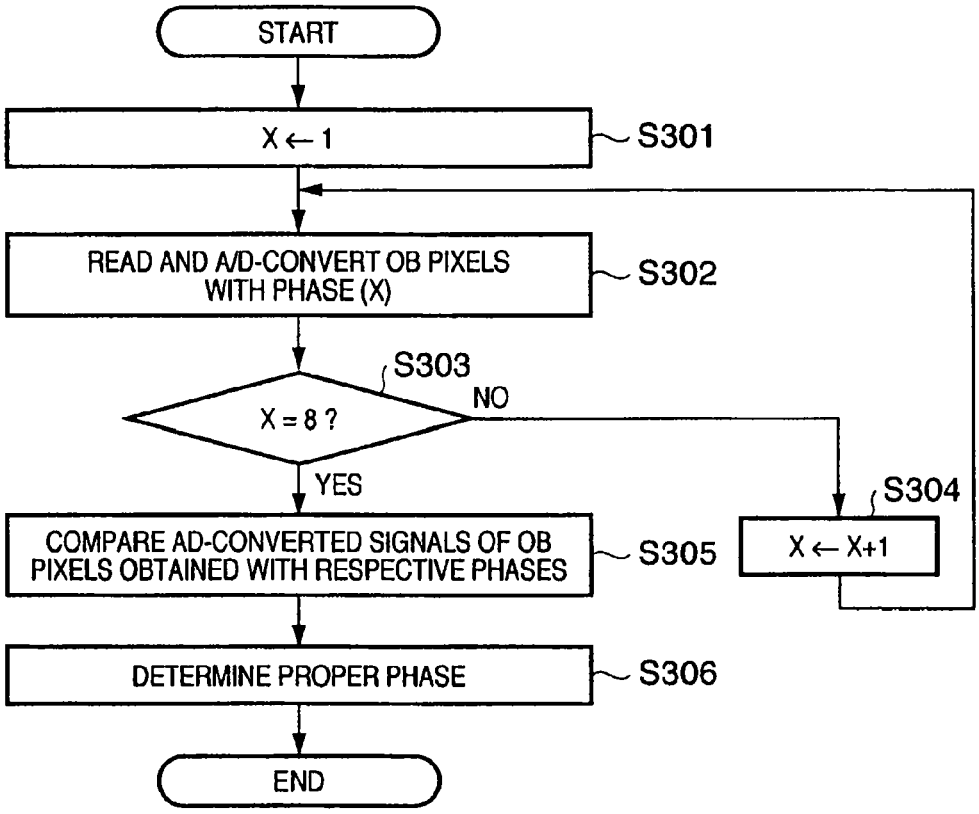
FIG. 10 is a flowchart showing processing for automatically determining the phase of the timing signal for operating the A/D converter in read out operation according to a second embodiment of the present invention.

In the second embodiment, the processes of determining a phase in steps 5102 and S109 in FIG. 3 become unnecessary, and processing shown in FIG. 10 is additionally performed in step S110 of reading the area sensor. Further, the adjustment performed during the production of image sensing apparatuses explained with reference to FIG. 9 becomes unnecessary.

In step S110 in FIG. 3, the output from the pixels of the area sensor 202 are A/D-converted by the A/D converter 209 in accordance with the ADTRG signal from the TG 201. At this time, a vertical optical black portion 205 is read out in advance of the effective pixel area of the area sensor 202. The operation will be explained with reference to FIG. 10, and it is assumed that the phases 1 to 8 are prepared as shown in FIG. 7.

In step S301, the parameter X is substituted by "1"

In step S302, a plurality of vertical OB pixels 205 are read out and A/D-converted in accordance with the ADTRG signal with the phase (X).

In step S303, whether the parameter X is 8 or not is checked.

If the parameter X is not 8, it is increased by 1 in step S304, and the processes in steps S302 and S303 are repeated. In this manner, a plurality of pixels in the vertical OB portion are read out and A/D-converted in accordance with the ADTRG signal with the phases 1 to 8.

In step S305, the outputs from pixels A/D-converted in accordance with the ADTRG signals with the phases 1 to 8 are compared with each other.

In step S306, a proper phase of the ADTRG signal is determined, and then pixels in the effective image sensing region are read out and A/D-converted in accordance with the ADTRG signal with the determined phase.

It should be noted that, in the above processes, the proper phase is searched from the phase 1 in the ascending order, however, it is also possible to search from the phase 8 in the descending order.

Further, in the method of searching a proper phase of the ADTRG signal in step S306 may be basically the same as that of step S205. Namely, the phase which gives the maximum output is determined as the proper phase, or the phase which gives the least difference between outputs from the two channels even when the phase is changed is determined as the proper phase.

Since the search in the second embodiment is performed using the outputs of the OB pixels, it may be difficult to find a proper phase since the output level is low comparing to the output level obtained by illuminating the image sensor as described with reference to FIG. 9. However, the output level of the OB pixels is still not too small to determine the proper phase.

In order to improve the precision for finding the proper phase of the ADTRG signal, a circuit which increase the output level of the OB pixels to a level higher than a predetermined level may be incorporated within the vertical OB pixels 205 and the capacitors 203.

According to the second embodiment as described above, the phase of the ADTRG signal is automatically adjusted when reading the area sensor, thus, adjustment performed in the factory upon manufacturing the image sensing apparatus can be omitted, and the reliability of the adjustment of the phase of the ADTRG signal improves. Furthermore, it is possible to realize a high quality image while keeping the speed of reading the pixels high.

The present invention is not limited to the above embodiments and various changes and modifications can be made within the spirit and scope of the present invention. Therefore to apprise the public of the scope of the present invention, the following claims are made.

What is claimed is:

[1. An image sensing apparatus having an image sensor, which has a first area for sensing an image of an object and a second area which is shielded from light, for sensing an image of an object, comprising:

an analog-digital converter that operates at a predetermined frequency and converts an analog signal read from the image sensor to a digital signal; and a controller that controls a relationship between a phase of a timing signal for reading out the analog signal from the image sensor and a phase of a timing signal for operating said analog-digital converter on the basis of signals obtained from the second area by relatively shifting the phase of the timing signal for reading out the analog signal and the phase of the timing signal for operating said analog-digital converter, and converting the analog signal by said analog-digital converter for each shifted phase.]

[2. The image sensing apparatus according to claim 1 further comprising:

a plurality of output units that read signals from the image sensor; and a multiplexer that multiplexes the signals from said plurality of output units to a time sequential signal and outputs the time sequential signal, wherein the time sequential signal from said multiplexer is outputted to said analog-digital converter.]

[3. The image sensing apparatus according to claim 1, wherein said controller adjusts the relationship between the phase of the timing signal for reading out the analog signal from the image sensor and the phase of the timing signal for operating said analog-digital converter so that a digital signal obtained by converting the signal read from the image sensor by said analog-digital converter becomes maximum.]

[4. The image sensing apparatus according to claim 2, wherein said controller adjusts the relationship between the phase of the timing signal for reading out the analog signal from the image sensor and the phase of the timing signal for operating said analog-digital converter so that a difference between the signals from said plurality of output units becomes minimum.]

[5. A control method of an image sensing apparatus having an image sensor, which has a first area for sensing an image of an object and a second area which is shielded from light, for sensing an image of an object, and an analog-digital converter which operates at a predetermined frequency and converts an analog signal read from the image sensor to a digital signal, comprising:

determining a relationship between a phase of a timing signal for reading out the analog signal from the image sensor and a phase of a timing signal for operating said analog-digital converter on the basis of signals obtained from the second area by relatively shifting the phase of the timing signal for reading out the analog signal and the phase of the timing signal for operating said analog-digital converter, and converting the analog signal by said analog-digital converter for each shifted phase.]

*6. An image sensing apparatus having an image sensor for sensing an image of an object, comprising:*

*a temperature sensor that measures temperature;*

*an analog-digital converter that operates at a predetermined frequency to convert a first analog signal to a first digital signal and convert a second analog signal to a second digital signal, wherein the first analog signal and the second analog signal are read from different pixels in a line via different channels; and*

*a controller that controls a relationship between a first phase of a timing signal for reading out the first analog signal and the second analog signal from the image sensor and a second phase of a timing signal for operating said analog-digital converter in accordance with the temperature measured by the temperature sensor.*

*7. The image sensing apparatus according to claim 6, further comprising a memory that stores a plurality of different phases for the first and second phases of the timing signal in correspondence with different temperatures in advance,*

*wherein said controller searches the first and second phases of the timing signal which corresponds to the measured temperature.*

*8. The image sensing apparatus according to claim 6, further comprising:*

*a plurality of output units, corresponding to the different channels, that read the first and second analog signals from the image sensor; and*

*a multiplexer that multiplexes the first and second analog signals from said plurality of output units into a time sequential signal and outputs the time sequential signal,*

*wherein the time sequential signal from said multiplexer is outputted to said analog-digital converter.*

*9. The image sensing apparatus according to claim 6, wherein said controller adjusts the relationship between the first phase of the timing signal for reading out the first and second analog signals from the image sensor and the second phase of the timing signal for operating said analog-digital converter so that the digital signals obtained by converting the first and second analog signals by said analog-digital converter becomes maximum.*

*10. The image sensing apparatus according to claim 6, wherein said controller adjusts the relationship between the first phase of the timing signal for reading out the first and second analog signal from said image sensor and the second phase of the timing signal for operating said analog-digital converter so that a difference between the digital signals obtained by converting the first and second analog signals becomes minimum.*

* * * * *